UNITED STATES PATENT OFFICE.

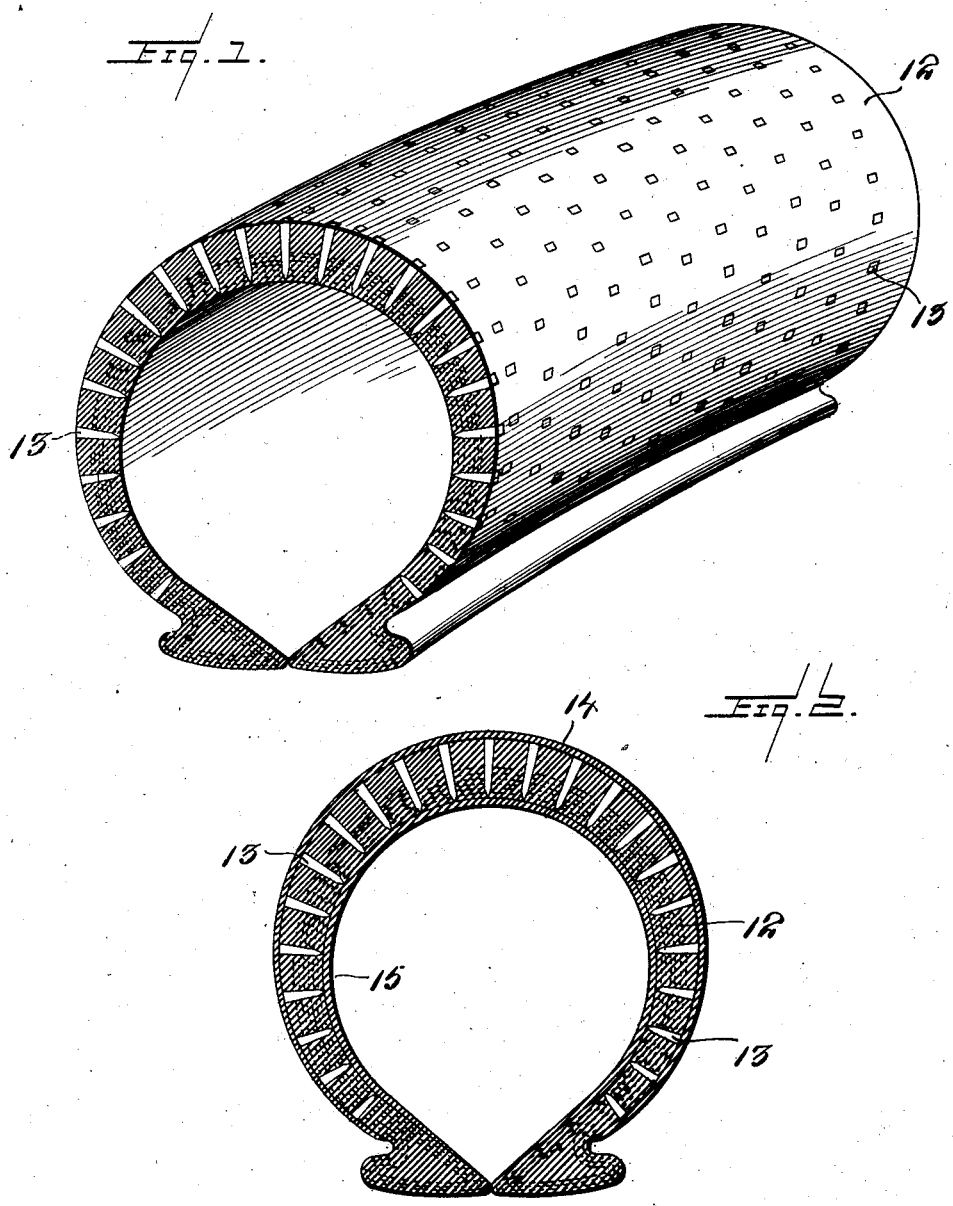

WILLIAM A. McCOOL, OF BEAVER FALLS, PENNSYLVANIA, ASSIGNOR TO HERCULES TIRE & RUBBER COMPANY, A CORPORATION OF DELAWARE.

PNEUMATIC TIRE.

1,011,471. Specification of Letters Patent. Patented Dec. 12, 1911.

Application filed December 11, 1909, Serial No. 532,580. Renewed April 11, 1911. Serial No. 620,460.

*To all whom it may concern:*

Be it known that I, WILLIAM A. McCOOL, a citizen of the United States, residing at Beaver Falls, in the county of Beaver and State of Pennsylvania, have invented or discovered certain new and useful Improvements in Pneumatic Tires, of which the following is a specification, reference being had therein to the accompanying drawings.

The bursting or blowing up of pneumatic tires on motor vehicles is largely due to the fact that the different layers composing the tires, and which are secured together by rubber in the vulcanizing process, become detached or loosened, owing to the heat developed in running the vehicles; so that the bodies of the tires become greatly weakened and are unable to withstand the great pressures to which they are subjected, and consequently burst. Attempts have been made to remedy this difficulty by securing the different plies or layers, composing the tires, together by stitching, but this has been found to be impracticable owing to the difficulty in effecting the stitching. Of course the tires cannot be sewed or stitched while they are on the formers, in the process of making, and after they have been removed from the formers they are in such shape and are composed of such materials that it has been found extremely difficult, and almost, if not quite, impracticable, to effect the stitching. Incidentally, in some tires which have been provided with non-skidding metallic studs or nails having exposed heads, the layers composing the tires have been secured together by such nails clenched at the inner sides of the tires, but for all practical purposes, in securing the layers composing the tire together, this has not proved to be of much, if any, practical use, for the reason that the exposed heads of the nails become greatly heated, and as metal nails themselves are good conductors of heat the tires become greatly injured and the holdings or anchorings of the nails become loosened by the heat, which rots or burns out the tires around the nails.

In accordance with the present invention the various layers composing the improved tires, and which are stuck together in the usual manner by rubber interposed between the various layers of canvas, or layers of canvas and rubber, are all securely and permanently fastened together by means of thickly studded pegs which are driven through the various layers while the tire is in process of making on the former; and after the various layers composing the tire have thus been securely fastened together by the pegs referred to these pegs will preferably be permanently secured in the tire by vulcanizing; a sheet or coating of rubber being preferably applied to the outer or tread surface of the tire after the pegs have been inserted, and the tire will then be vulcanized in the usual manner. If desired, the pegs may be secured in the tires by shellac or other adhesive material, which, in liquid form, may be run in with the pegs as the latter are inserted. Also preferably an inner layer of canvas will be vulcanized to the inner surface of the tire after the pegs have been applied, such inner layer acting as a guard to prevent the ends of the pegs from being exposed in such a manner as to be injurious to the inner or air tube of the tire. The pegs referred to will preferably be ordinary wooden shoe pegs, but it will be understood that pegs of any other suitable material, as vulcanized fiber, hard rubber, or even metal, may be used, and that such pegs may be roughened or threaded, to give them a better grip or hold, if desired.

In the accompanying drawings, Figure 1 represents a portion of the outer tube of a pneumatic tire embodying the present invention, before the outer layer of rubber has been applied. Fig. 2 is a cross section of the improved tire in its preferred form after having been fully completed.

Referring to the drawings, the body 12 of the tire may be of any ordinary or well known construction, comprising, as is usual, a number of layers of canvas secured together by vulcanized rubber, and an outer layer of rubber vulcanized to the canvas portion of the tire. The various layers composing the body of the tire are secured together throughout the tire, both longitudinally and circumferentially, by a series of thickly studded pegs 13 which will preferably be ordinary wooden shoe pegs, and which are driven through the various layers comprising the tire while the latter is on the former in the process of making and before vulcanization. After the pegs referred to have thus been driven through the body of the tire, to secure the various layers composing the same together, an outer layer 14 of rubber, and an inner layer 15, of canvas, or other suitable material, through which the pegs will not extend, will preferably be applied to the body of the tire, and the latter will then be vulcanized in the usual manner, thus securing all of the layers composing the tire strongly together, or the pegs may be inserted after vulcanization, if desired. The pegs may also be anchored in place by means of liquid shellac or other suitable adhesive material with which they may be coated as they are driven in, or which may be run into the holes in the layers as the pegs are inserted.

The improved tire, having its various layers secured together throughout by the thickly studded pegs, vulcanized in and thus immovably secured in place in the tire, will be very much longer-lived than pneumatic tires as heretofore constructed, in that the various layers composing the tire will be strongly secured together throughout, and cannot become loosened or detached by the heat usually developed in running motor vehicles, and which heat softens the rubber securing the various layers together to such an extent as to permit them to work loose from each other, thus weakening the tire, as hereinbefore stated, and rendering the same liable to burst or blow up. The pegs which secure the various layers of the improved tire together are preferably of wood, or other heat non-conducting material, will not become loosened in the tire, so that the layers comprising the same will remain together in a strong and practically integral body, instead of becoming weakened by a loosening of the layers, as in the tires heretofore generally in use. The separated pegs may be inserted as thickly as may be desired, and will not appreciably detract from the flexibility or elasticity of the improved tires.

Having thus described my invention I claim and desire to secure by Letters Patent:

1. A pneumatic tire, consisting of a plurality of layers of elastic material and composed largely of rubber, and which tire is thickly studded throughout its body portion, including the parts thereof which come near the rim of the wheel, with pegs passing through said layers and strongly securing the same together.

2. A pneumatic tire consisting of a plurality of layers of material, said tire being thickly studded throughout its body portion with pegs passing through said layers and strongly securing the same together, the said tire comprising an outer layer of rubber vulcanized to the said body portion and covering the outer ends of said pegs.

3. A pneumatic tire consisting of a plurality of layers of material, said tire being thickly studded throughout its body portion with pegs passing through said layers and strongly securing the same together, the said tire comprising an outer layer of rubber vulcanized to the said body portion and covering the outer ends of said pegs, the latter being anchored in place by an adhesive material.

In testimony whereof I affix my signature, in presence of two witnesses.

WILLIAM A. McCOOL.

Witnesses:
CHAS. S. HYER,
C. M. SWEENEY.